United States Patent
Dong et al.

(10) Patent No.: US 10,205,399 B2
(45) Date of Patent: Feb. 12, 2019

(54) SWITCHING STRATEGY FOR INCREASED EFFICIENCY OF POWER CONVERTERS

(71) Applicant: General Electric Company, Schenectady, NY (US)

(72) Inventors: Dong Dong, Schenectady, NY (US); Robert Gregory Wagoner, Roanoke, VA (US); Govardhan Ganireddy, Bangalore (IN); Ravisekhar Nadimpalli Raju, Clifton Park, NY (US)

(73) Assignee: GENERAL ELECTRIC COMPANY, Schenectady (VU)

( * ) Notice: Subject to any disclaimer, the term of this patent is extended or adjusted under 35 U.S.C. 154(b) by 0 days.

(21) Appl. No.: 15/405,712

(22) Filed: Jan. 13, 2017

(65) Prior Publication Data
US 2018/0205335 A1    Jul. 19, 2018

(51) Int. Cl.
*H02M 5/458* (2006.01)
*H02K 11/33* (2016.01)
(Continued)

(52) U.S. Cl.
CPC ........... *H02M 5/4585* (2013.01); *H02J 3/386* (2013.01); *H02K 11/33* (2016.01);
(Continued)

(58) Field of Classification Search
CPC . H02M 2001/0032; H02M 2001/0048; H02M 2001/007; H02M 3/33576; H02M 3/33584; H02M 5/458; H02M 5/4585; H02M 7/537; H02M 7/5387; H02M 7/53871; H02M 7/797; H02K 11/33; H02J 3/386; H02P 9/007; F03D 7/042
See application file for complete search history.

(56) References Cited

U.S. PATENT DOCUMENTS 5,638,263 A    6/1997  Opal et al.
5,986,909 A   11/1999  Hammond et al.
(Continued)

FOREIGN PATENT DOCUMENTS

EP       2290799 A1    3/2011
WO    2016009047 A1    1/2016

OTHER PUBLICATIONS

M Kavitha et al., "New Cascaded H-Bridge Multilevel Inverter Topology with Reduced Number of Switches and Sources", IOSR Journal of Electrical and Electronics Engineering (IOSR-JEEE), vol. 2, Issue: 6, pp. 26-36, Sep.-Oct. 2012.
(Continued)

*Primary Examiner* — Fred E Finch, III
(74) *Attorney, Agent, or Firm* — GE Global Patent Operation; Nitin Joshi

(57) ABSTRACT

Systems and methods for operating a power converter are provided. A DC to AC converter can include an inner converter and an outer converter. The inner converter can include an isolation transformer a first plurality of switching devices. The outer converter can include a second plurality of switching devices. A control method can include determining an output voltage of the outer converter. The control method can further include controlling operation of the inner converter based at least in part on the output voltage of the outer converter.

18 Claims, 6 Drawing Sheets

(51) Int. Cl.
| | |
|---|---|
| *H02J 3/38* | (2006.01) |
| *H02M 3/335* | (2006.01) |
| *H02M 7/797* | (2006.01) |
| *H02P 9/00* | (2006.01) |
| *H02M 7/48* | (2007.01) |
| *F03D 7/04* | (2006.01) |
| *H02K 7/18* | (2006.01) |
| *H02M 7/5387* | (2007.01) |
| *H02M 1/00* | (2006.01) |
| *F03D 7/02* | (2006.01) |

(52) U.S. Cl.
CPC ....... *H02M 3/33584* (2013.01); *H02M 5/458* (2013.01); *H02M 7/4807* (2013.01); *H02M 7/797* (2013.01); *H02P 9/007* (2013.01); *F03D 7/0272* (2013.01); *F03D 7/042* (2013.01); *H02K 7/183* (2013.01); *H02M 7/5387* (2013.01); *H02M 2001/007* (2013.01); *H02M 2001/0032* (2013.01)

(56) References Cited

U.S. PATENT DOCUMENTS

| | | | |
|---|---|---|---|
| 6,222,284 | B1 | 4/2001 | Hammond et al. |
| 6,697,271 | B2 | 2/2004 | Corzine |
| 7,502,242 | B2 | 3/2009 | Iida |
| 7,568,931 | B2 | 8/2009 | Hammond |
| 7,800,254 | B2 | 9/2010 | Hammond |
| 8,008,923 | B2 | 8/2011 | Hammond |
| 8,093,764 | B2 | 1/2012 | Hammond |
| 8,207,812 | B2 | 6/2012 | Roc et al. |
| 8,441,147 | B2 | 5/2013 | Hammond |
| 8,988,860 | B2 | 3/2015 | Hammond |
| 9,257,848 | B2 | 2/2016 | Coccia et al. |
| 9,277,683 | B2 | 3/2016 | Ionescu et al. |
| 2006/0233000 | A1* | 10/2006 | Akagi ................ H02M 5/4585 363/37 |
| 2008/0049467 | A1* | 2/2008 | Takayanagi ............ H02M 1/32 363/56.03 |
| 2008/0143111 | A1* | 6/2008 | Ichinose ................ H02P 9/007 290/44 |
| 2008/0296898 | A1* | 12/2008 | Ichinose ................. H02P 9/10 290/44 |
| 2008/0304188 | A1* | 12/2008 | Ichinose ................ H02P 9/102 361/20 |
| 2009/0200803 | A1* | 8/2009 | Ichinose .................. H02J 3/18 290/44 |
| 2009/0278354 | A1* | 11/2009 | Ichinose ................ H02P 9/007 290/44 |
| 2009/0278405 | A1 | 11/2009 | Stancu et al. |
| 2010/0014325 | A1* | 1/2010 | Raju ..................... H02M 5/271 363/37 |
| 2010/0226151 | A1* | 9/2010 | Chen .................... H02M 3/335 363/21.12 |
| 2013/0181519 | A1 | 7/2013 | Lee |
| 2014/0084689 | A1* | 3/2014 | Jung ....................... H02J 3/32 307/43 |
| 2015/0070939 | A1* | 3/2015 | Gupta ...................... H02J 3/36 363/17 |
| 2015/0078049 | A1* | 3/2015 | Yoo .................. H02M 7/53871 363/123 |
| 2015/0372584 | A1* | 12/2015 | Hirota ..................... H02M 1/15 363/37 |
| 2016/0336873 | A1 | 11/2016 | Ayai |
| 2016/0352230 | A1 | 12/2016 | Norimatsu et al. |

OTHER PUBLICATIONS

Sadikin et al., "DC-DC type bidirectional high-frequency link DC for improved power quality of cascaded multilevel inverter", Power and Energy (PECon), 2012 IEEE International Conference on, pp. 49-54, Kota Kinabalu, Dec. 2-5, 2012.

Zengin et al., "Bi-directional DCM DAB inverter for SST applications", Fundamentals of Electrical Engineering (ISFEE), 2014 International Symposium on, pp. 1-5, Nov. 28-29, 2014, Bucharest.

Xuan Nguyen et al., "A modified cascaded multilevel converter topology for high power bidirectional inductive power transfer systems with the reduction of switching devices and power losses", Power Electronics and Drive Systems (PEDS), 2015 IEEE 11th International Conference on, pp. 93-97, Jun. 9-12, 2015, Sydney, NSW.

Garcia-Rodriguez et al., "A new SST topology comprising boost three-level AC/DC converters for applications in electric power distribution systems", Energy Conversion Congress and Exposition (ECCE), 2015 IEEE, pp. 6051-6058, Sep. 20-25, 2015, Montreal, QC.

* cited by examiner

SWITCHING STRATEGY FOR INCREASED EFFICIENCY OF POWER CONVERTERS

STATEMENT REGARDING FEDERALLY SPONSORED RESEARCH & DEVELOPMENT

This invention was made with Government support under contract number DE-EE0007252 awarded by the Department of Energy. The Government has certain rights in the invention.

FIELD

The present subject matter relates generally to power systems, and more particularly to systems and methods for increasing the efficiency of power converters.

BACKGROUND

Power generation systems can use power converters to convert power into a form of power suitable for an energy grid. In a typical power converter, a plurality of switching devices, such as insulated-gate bipolar transistors ("IGBTs") or metal-oxide-semiconductor field effect transistors ("MOSFETs") can be used in electronic circuits, such as half bridge or full-bridge circuits, to convert the power. Recent developments in switching device technology have allowed for the use of silicon carbide ("SiC") MOSFETs in power converters. Using SiC MOSFETs allows for operation of a power converter at a much higher switching frequency compared to conventional IGBTs.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a control method for operating a DC to AC converter. The DC to AC converter can include an inner converter and an outer converter. The inner converter can include an isolation transformer and a first plurality of switching devices. The outer converter can include a second plurality of switching devices. The method can include determining an output voltage of the outer converter. The method can also include controlling operation of the inner converter based at least in part on the output voltage of the outer converter.

Another example aspect of the present disclosure is directed to a power conversion system. The power conversion system can include a DC to AC converter comprising an inner converter and an outer converter. The inner converter can include an isolation transformer and a first plurality of switching devices. The outer converter can include a second plurality of switching devices. The power conversion system can also include a control system configured to control operation of the DC to AC converter. The control system can be configured to determine an output voltage of the outer converter. The control system can further be configured to control operation of the inner converter based at least in part on the output voltage of the outer converter.

Another example aspect of the present disclosure is directed to a wind power generation system. The wind power generation system can include a wind power generator configured to generate AC power and an AC to DC converter coupled to the wind power generator. The AC to DC converter can be configured to convert the AC power from the wind power generator to a DC power. The wind power generation system can also include a DC link coupled to the AC to DC converter. The DC link can be configured to receive DC power from the AC to DC converter. The wind power generation system can also include a DC to AC converter coupled to the DC link. The DC to AC converter can be configured to receive DC power from the DC link. The DC to AC converter can include an inner converter and an outer converter. The inner converter can include an isolation transformer and a first plurality of switching devices. The outer converter can include a second plurality of switching devices. At least one switching device in the first plurality or second plurality of switching devices can be a silicon carbide MOSFET. The wind power generation system can also include a control system configured to control operation of the DC to AC converter. The control system can be configured to determine an output voltage of the outer converter. The control system can also be configured to control operation of the inner converter based at least in part on the output voltage of the outer converter. When the output voltage of the outer converter is zero volts, the control system can be configured to control the inner converter to an off state. When the output voltage of the outer converter is non-zero, the control system can be configured to control the inner converter to an on state.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
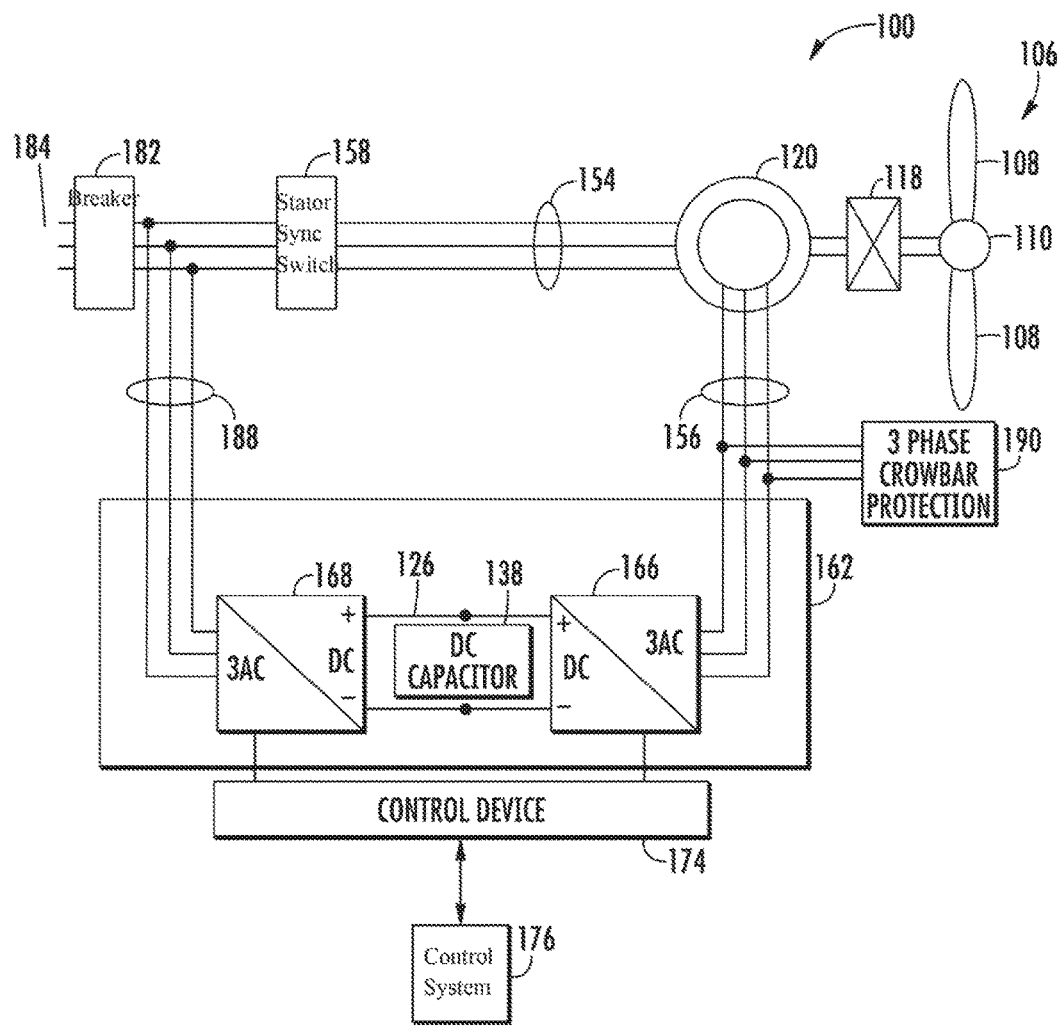
FIG. 1 depicts an example wind power generation system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for increasing the efficiency of a power converter. For example, power generation systems, such as systems using doubly fed induction generators ("DFIGs") as power generation units, can use one or more power converters to convert power from a low voltage multiphase alternating current power into a medium voltage multiphase alternating current power. As used herein, "LV" power can be a power less than about 1.5 kilovolts. As used herein, "MV" power can be power greater than about 1.5 kilovolts and less than about 100 kilovolts. As used herein, the term "about" can mean within 20% of the stated value.

The power converter can include, for example, a first power converter configured to convert AC power output from a power generator, such as a DFIG, into a DC power, and provide the DC power to a DC link. A second power converter can be configured to convert the DC power from the DC link into an AC power suitable for use on energy grid. For example, the second power converter can be a DC to DC to AC power converter, and can utilize SiC MOSFETs as the switching devices, thereby allowing very high switching frequency. Other switching devices can be be used in a power converter as well. The DC to DC to AC converter can include an inner converter and an outer converter. The inner converter can include a first DC to AC conversion entity configured to convert LV DC power from the DC link to an LV AC power, an isolation transformer configured to provide isolation. A second AC to DC conversion entity can be configured to convert the LV AC power to a LV DC power. The outer converter can include a third DC to AC conversion entity configured to convert the LV DC power to an LV AC power suitable for use on an energy grid. A plurality of inverter blocks can be connected in series to build a MV AC voltage suitable for use on a MV AC energy grid. Each conversion entity can include a plurality of bridge circuits, wherein each bridge circuit can include a plurality of switching devices, such as SiC MOSFETs. The outer converter can be configured to regulate the line current. Depending upon the modulation strategy implemented, the output voltage of the outer converter can be either a +Vdc, −Vdc, or zero voltage. In an embodiment, the DC to AC converter can include a plurality of DC to DC to AC inverter blocks, wherein each inverter block includes a first conversion entity, a second conversion entity, third conversion entity, and an isolation transformer as described herein. In another embodiment, the DC to AC converter can be a multiphase (e.g., three phase) DC to AC converter configured to convert a multiphase power output from a power generation unit.

An advantage provided by the very high switching frequency allowed by the SiC MOSFETs is that the size and cost of the isolation transformers can be significantly reduced, and can improve the efficiency of the power converter as compared to conventional IGBTs. However, in some cases, anywhere from 10-90% of the power losses in a DC to DC to AC power converter can be from the isolation transformers, such as, for example, losses due to heating of the isolation transformer components. Further, in order to meet certain power density and reliability standards, the heat in the isolation transformers must be effectively removed, which can increase the cost of a cooling system required for the power converter. Additionally, the peak power rating of a power converter can be limited by a thermal constraint from the isolation transformers.

In a typical configuration, the inner converter is kept running all of the time to allow for power flow to be available to the outer converter when needed. However during periods of time when the output voltage of the outer converter is zero, the power flow from the outer converter to the inner converter is zero. For example, in every switching cycle of the outer converter, the power flow between the inner converter and the outer converter can be zero for varying periods of time, depending on the modulation index. Thus, during periods of time when the outer converter output is zero volts, in a typical configuration, power can still flow through the isolation transformer, thereby causing losses due to heating of the isolation transformer.

Example aspects of the present disclosure are directed to systems and methods of switching a power converter to more efficiently convert the power. For example, the systems and methods according to example aspects of the present disclosure can allow for an inner converter to be turned off during periods of time when the outer converter is providing zero output voltage. For example, a method can include first determining an output voltage of the outer converter. An output voltage can be determined in any number of ways. For example, an output voltage can be determined by identifying one or more gate commands to the outer converter. In an embodiment, a control device can be configured to identify one or more gate commands to an outer converter, and determine the output voltage based at least in part on the one or more gate commands. In another embodiment, a control device can be configured to determine when the output voltage is zero based on one or more measured parameters.

Further, the method can include controlling the operation of an inner converter based at least in part on the output voltage of the outer converter. For example, when the output voltage of the outer converter is zero volts, a control device can be configured to turn the inner converter to an off state. As used herein, the term "off state" means a state of operation wherein essentially no power is flowing through the device. For example, an off state can be a state in which one or more switching devices (e.g., SiC MOSFETs) are operated in a converter such that power flow through the converter essentially stops. Further, when the output voltage of the outer converter is non-zero, such as, for example, when an outer converter is providing a +Vdc or −Vdc output, a control device can control an inner converter to an on state. As used herein, the turn "on state" means a state of operation wherein power can flow through the device. For example, an on state can be a state in which one or more switching devices (e.g., SiC MOSFETs) are operated in a converter such that power flow through the converter occurs, such as power flow through an isolation transformer.

In an embodiment, an output voltage can be determined by identifying one or more gate commands to the outer converter. The operation of the inner converter can then be controlled based at least in part on the one or more gate commands to the outer converter. For example, when the one or more gate commands to the outer converter include a non-zero duty cycle, the inner converter can be controlled to an on state. In another embodiment, controlling the inner converter based at least in part on the one or more commands to the outer converter can comprise controlling the duty cycle of gate commands to the inner converter based at least in part on the duty cycle of the gate commands to the outer converter. For example, an outer converter can be operated in a pulse width modulation ("PWM") mode in order to regulate a line current. When the outer converter is operated in a PWM mode, one or more gating commands can be provided to the outer converter to switch the outer converter on to provide pulses to generate a desired output waveform. Each pulse can include an on period and an off period. In an embodiment, the duty cycle of gate commands to an inner converter can be the same as the duty cycle of gate commands to the outer converter. For example, the inner converter can be turned on during periods of time where the outer converter is in PWM mode and operating in an on period of a pulse. Further, the inner converter can be turned off during periods of time when the outer converter is in PWM mode and operating in an off period of a pulse.

In this way, the systems and methods according to example aspects of the present disclosure can have a technical effect of allowing for more efficient operation of a DC to AC power converter that utilizes an isolation transformer by reducing the core losses in the isolation transformers. For instance, in some cases the core losses can be reduced by up to 50%. Further, the systems and methods according to example aspects of the present disclosure can allow for more easily meeting power density and reliability standards by reducing the amount of heat that must be removed from the isolation transformers, thereby allowing for a reduction in the cost of a cooling system. Further, in instances in which the peak power rating of a DC to AC power converter and/or a DC to AC inverter block is limited by a thermal constraint of an isolation transformer, operating the DC to AC power converter and/or inverter block according to example aspects of the present disclosure can allow for an increased power rating while meeting the thermal constraint. Thus, fewer DC to AC power converters and/or DC to AC inverter blocks in a power converter may be needed to meet a specific power rating, which can increase the reliability of a power conversion system by reducing the number of components in the system.

With reference now to the figures, example aspects of the present disclosure will be discussed in greater detail. FIG. 1 depicts a wind power generation system 100 according to example aspects of the present disclosure, which includes a DFIG 120. The present disclosure will be discussed with reference to the example wind power generation system 100 of FIG. 1 for purposes of illustration and discussion. Those of ordinary skill in the art, using the disclosures provided herein, should understand that aspects of the present disclosure are also applicable in other systems, such as full power conversion wind turbine systems, solar power systems, energy storage systems, and other power systems.

In the example wind power generation system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus provides an output multiphase power (e.g. three-phase power) from a stator of DFIG 120 and the rotor bus 156 provides an output multiphase power (e.g. three-phase power) of DFIG 120. The power converter 162 can be a bidirectional power converter configured to provide output power to an electrical grid 184 and/or to receive power from the electrical grid 184. As shown, DFIG 120 is coupled via the rotor bus 156 to a rotor side converter 166. The rotor side converter 166 is coupled to a line side converter 168 which in turn is coupled to a line side bus 188. An auxiliary power feed (not depicted) can be coupled to the line side bus 188 to provide power for components used in the wind power generation system 100, such as fans, pumps, motors, and other components.

In example configurations, the rotor side converter 166 and/or the line side converter 168 are configured for normal operating mode in a three-phase, pulse width modulation (PWM) arrangement using SiC MOSFETs and/or IGBTs as switching devices. SiC MOSFETs can switch at a very high frequency as compared to conventional IGBTs. For example, SiC MOSFETs can be switched at a frequency from approximately 0.01 Hz to 10 MHz, with a typical switching frequency of 1 KHz to 400 KHz, whereas IGBTs can be switched at a frequency from approximately 0.01 Hz to 200 KHz, with a typical switching frequency of 1 KHz to 20 KHz. Additionally, SiC MOSFETs can provide advantages over ordinary MOSFETs when operated in some voltage ranges. For example, in power converters operating at 1200V-1700V on the LV side, SiC MOSFETs have lower switching losses than ordinary MOSFETs.

In some implementations, the rotor side converter 166 and/or the line side converter 168 can include a plurality of conversion modules, each associated with a an output phase of the multiphase power, as will be discussed in more detail with respect to FIGS. 2 and 3. The rotor side converter 166 and the line side converter 168 can be coupled via a DC link 126 across which can be a DC link capacitor 138.

The power converter 162 can be coupled to a control device 174 to control the operation of the rotor side converter 166 and the line side converter 168. It should be noted that the control device 174, in typical embodiments, is configured as an interface between the power converter 162 and a control system 176.

In operation, power generated at DFIG 120 by rotating the rotor 106 is provided via a dual path to electrical grid 184. The dual paths are defined by the stator bus 154 and the rotor bus 156. On the stator bus 154 side, sinusoidal multiphase (e.g. three-phase) is provided to the power delivery point (e.g., electrical grid 184). In particular, the AC power provided via the stator bus 154 can be a medium voltage ("MV") AC power. On the rotor bus side 156, sinusoidal multiphase (e.g. three-phase) AC power is provided to the power converter 162. In particular, the AC power provided to the power converter 162 via the rotor bus 156 can be a low voltage ("LV") AC power. The rotor side power converter 166 converts the LV AC power provided from the rotor bus 156 into DC power and provides the DC power to the DC link 126. Switching devices (e.g. SiC MOSFETs and/or IGBTs) used in parallel bridge circuits of the rotor side power converter 166 can be modulated to convert the AC power provided from the rotor bus 156 into DC power suitable for the DC link 126. Such DC power can be a LV DC power.

In a wind power generation system 100, the power converter 162 can be configured to convert the LV AC power to MV AC power. For example, the line side converter 168 can convert the LV DC power on the DC link 126 into a MV AC power suitable for the electrical grid 184. In particular, switching devices, such as SiC MOSFETs, used in bridge circuits of the line side power converter 168 can be modulated to convert the DC power on the DC link 126 into AC power on the line side bus 188. SiC MOSFETs can be operated at a higher switching frequency than conventional IGBTs. In addition, one or more isolation transformers coupled to one or more of the bridge circuits can be configured to step the voltage up to the MV voltage. The MV AC power from the power converter 162 can be combined with the MV power from the stator of DFIG 120 to provide multiphase power (e.g. three-phase power) having a frequency maintained substantially at the frequency of the electrical grid 184 (e.g. 50 Hz/60 Hz). In this manner, the MV line side bus 188 can be coupled to the MV stator bus 154 to provide such multiphase power.

Various circuit breakers and switches, such as breaker 182, stator sync switch 158, etc. can be included in the wind power generation system 100 for isolating the various components as necessary for normal operation of DFIG 120 during connection to and disconnection from the electrical grid 184. In this manner, such components can be configured to connect or disconnect corresponding buses, for example, when current flow is excessive and can damage components of the wind power generation system 100 or for other operational considerations. Additional protection components can also be included in the wind power generation system 100. For example, as depicted in FIG. 1, a multiphase crowbar circuit 190 can be included to protect against an overvoltage condition damaging circuits of the wind power generation system 100.

The power converter 162 can receive control signals from, for instance, the control system 176 via the control device 174. The control signals can be based, among other things, on sensed conditions or operating characteristics of the wind power generation system 100. Typically, the control signals provide for control of the operation of the power converter 162. For example, feedback in the form of sensed speed of the DFIG 120 can be used to control the conversion of the output power from the rotor bus 156 to maintain a proper and balanced multiphase (e.g. three-phase) power supply. Other feedback from other sensors can also be used by the control device 174 to control the power converter 162, including, for example, stator and rotor bus voltages and current feedbacks. Using the various forms of feedback information, switching control signals (e.g. gate timing commands for switching devices), stator synchronizing control signals, and circuit breaker signals can be generated.

Figure 2:
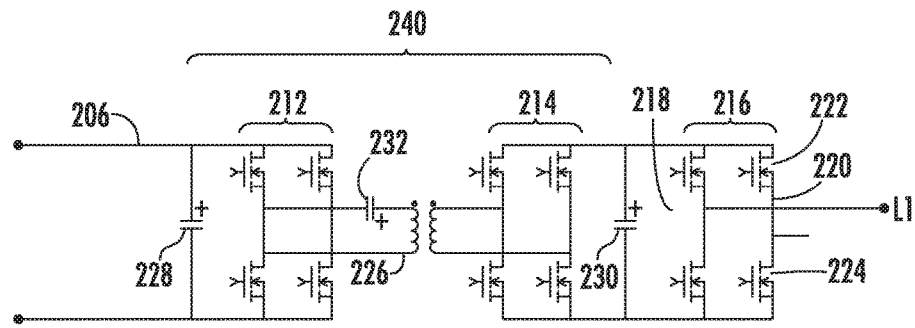
FIG. 2 depicts example elements for use in a power converter according to example aspects of the present disclosure.

Referring now to FIG. 2, a topology of a component in a DC to DC to AC converter is depicted. FIG. 2 depicts an example DC to DC to AC inverter block 206, which can be included in a conversion module 200 of a line side converter 168, as depicted in FIG. 3. Each inverter block 206 can include a plurality of conversion entities. For instance, inverter block 206 can include first conversion entity 212, a second conversion entity 214, and a third conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFETs, which can be operated at higher switching frequencies than conventional IGBTs. Additionally, the switching devices can be conventional IGBTs and/or MOSFETs.

As shown, inverter block 206 further includes an isolation transformer 226. The isolation transformer 226 can be coupled to conversion entity 212 and conversion entity 214. As shown, the inverter block 206 can further include capacitors 228 and 230. First conversion entity 212, isolation transformer 226, and second conversion entity 214 can together define an inner converter 240. Inner converter 240 can be operated to convert a LV DC power from the DC link 126 to a LV DC power. In an embodiment, inner converter 240 can be a high-frequency resonant converter. In a resonant converter configuration, a resonant capacitor 232 can be included in inner converter 240. In various embodiments, a resonant capacitor 232 can be included on a LV side of the isolation transformer 226 as depicted in FIG. 2, on an MV side of the isolation transformer 226 (not depicted), or on both the LV and MV sides of the isolation transformer 226 (not depicted). In another embodiment, inner converter 240 can be a hard-switched converter by removing the resonant capacitor 232.

Third conversion entity 216 can also be referred to as an outer converter 216. Outer converter 216 can convert a LV DC power from the inner converter to a LV AC power suitable for use on an energy grid 184. A plurality of inverter blocks can be connected in series to build a MV AC voltage suitable for use on a MV AC energy grid. In a typical application, outer converter 216 can be a hard-switched converter, and therefore not include a resonant capacitor.

Figure 3:
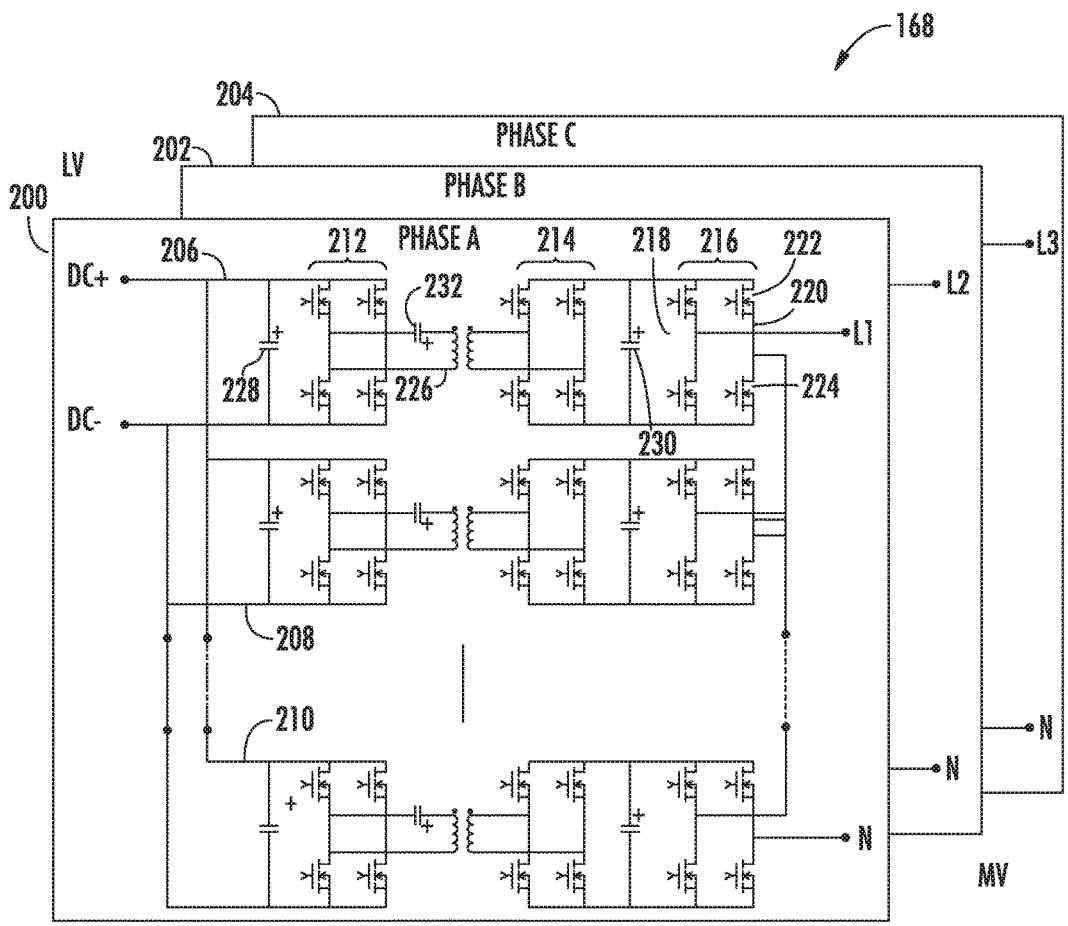
FIG. 3 depicts an power converter according to example aspects of the present disclosure.

FIG. 3 depicts an example line side converter 168 according to example embodiments of the present disclosure. As shown, the line side converter 168 includes conversion module 200, conversion module 202, and conversion module 204. The conversion modules 200-204 can be configured to receive a LV DC power from the rotor side converter 166, and to convert the LV DC power to a MV AC power for feeding to the electrical grid 184. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of inverter blocks 206-210. For instance, as shown, conversion module 200 includes inverter blocks 206, inverter block 208, and inverter block 210. In an embodiment, each conversion module 200-204 can include any number of inverter blocks 206-210. The line side converter 168 can be a bidirectional power converter. The line side converter 168 can be configured to convert a LV DC power to a MV AC power and vice versa. For instance, when providing power to the electrical grid 184, the line side converter 168 can be configured to receive a LV DC power from the DC link 126 on a LV side of the line side converter 168, and to output a MV AC power on a MV side of the line side converter 168. The inverter blocks 206-210 can be coupled together in parallel on the LV side and can be coupled together in series on the MV side.

In one particular example implementation, when providing power to the electrical grid 184, the conversion entity 212 can be configured to convert the LV DC on the DC link 126 to a LV AC power. The isolation transformer 226 can be configured to provide isolation. The conversion entity 214 can be configured to convert the LV AC power to a LV DC power. The conversion entity 216 can be configured to convert the LV DC power to a LV AC power suitable for provision to the electrical grid 184. A plurality of inverter blocks can be connected in series on the MV side to collectively step up the voltage of the power on the DC link 126 to a MV AC power.

The inverter blocks 206-210 can be configured to contribute to the overall MV AC power provided by the conversion module 200. In this manner, any suitable number of inverter blocks can be included within the conversion modules 200-204. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the control device 174 can provide suitable gate timing commands to the gates of the switching devices of the bridge circuits. The gate timing commands can control the pulse width modulation of the switching devices to provide a desired output.

It will be appreciated, that although FIG. 3 depicts only the line side converter 168, the rotor side converter 166 depicted in FIG. 2 can include the same or similar topology. In particular, the rotor side converter 166 can include a plurality of conversion modules having one or more conversion entities as described with reference to the line side converter 168. Further, it will be appreciated that the line side converter 168 and the rotor side converter 166 can include SiC MOSFETs, IGBT switching devices, and/or other suitable switching devices. In implementations wherein the rotor side converter 166 is implemented using SiC MOSFETs, the rotor side converter 166 can be coupled to a crowbar circuit (e.g. multiphase crowbar circuit 190) to protect the SiC MOSFETs from high rotor current during certain fault conditions.

Figure 4:
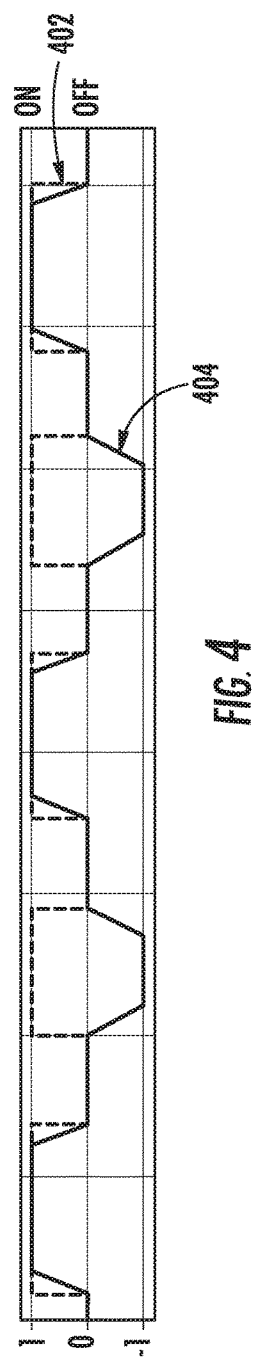
FIG. 4 depicts an example switching strategy according to example aspects of the present disclosure.

Referring now to FIG. 4, an example switching strategy according to example aspects of the present disclosure is depicted. FIG. 4 depicts an inner converter command 402 and an outer converter duty cycle command 404. As shown, inner converter command 402 can be used to control operation of an inner converter 240, as depicted in FIG. 2. For example, when an inner converter command 402 comprises an "on command," an inner converter 240 can be controlled to an on state by, for example, providing switching commands to one or more SiC MOSFETs in a first conversion entity 212 and a second conversion entity 214 such that power flows through the inner converter 240, including through the isolation transformer 226. When an inner converter command 402 comprises an "off command," an inner converter 240 can be controlled to an off state by, for example, providing switching commands to one or more SiC MOSFETs in a first conversion entity 212 and a second conversion entity 214 such that power does not flow through the inner converter 240, including through the isolation transformer 226. In this way, an inner converter command 402 can be used to control operation of an inner converter 240 in a power converter, such as a line side converter 168.

Further, as depicted in FIG. 4, the inner converter command 402 can be turned off during periods of time when the outer converter duty cycle command is a zero. For example, an outer converter duty cycle command 404 can vary between a +1 and a −1. The outer converter duty cycle command 404 can thus be used to regulate a line current by, for example, controlling an output voltage from the outer converter. For example when an output voltage of an outer converter is 0 V, the outer converter duty cycle command 404 can be a zero. When the outer converter duty cycle command 404 is a zero, the inner converter command 402 can be an off command. In this way, the inner converter 240 can be turned to an off state when an output voltage is zero or an outer converter duty cycle command is a zero. When an outer converter duty cycle command 404 is non-zero, an inner converter command 402 can be an on command, thereby controlling the inner converter to an on state. In this way, the inner converter 240 can be controlled to an on state, thereby flowing power through an isolation transformer 226, only during periods of time when power is flowing through an outer converter 216.

Figure 5:
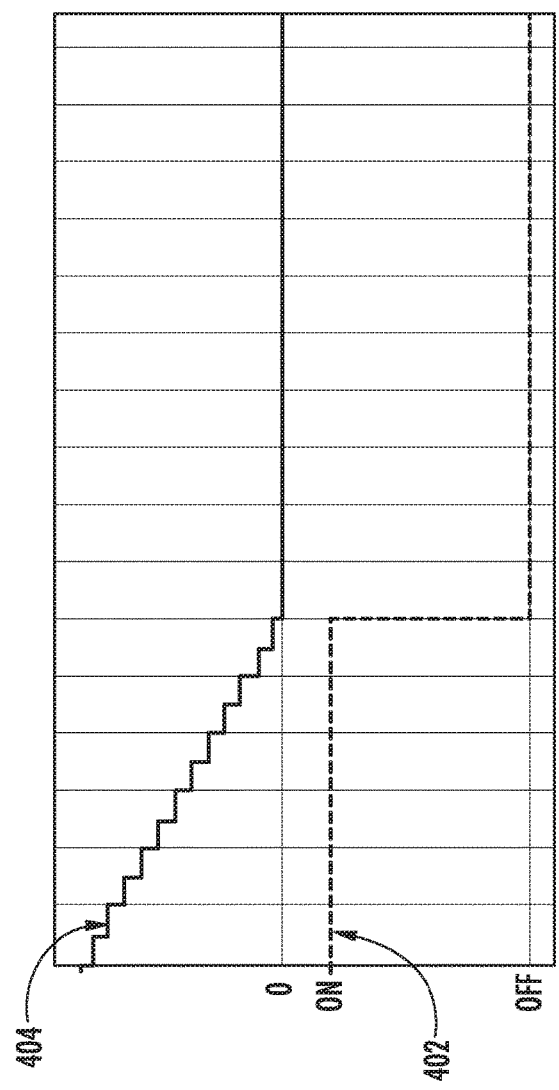
FIG. 5 depicts an example switching strategy according to example aspects of the present disclosure.

Referring now to FIG. 5, an example switching strategy according to example aspects of the present disclosure is similarly depicted. FIG. 5 depicts a portion of the switching strategy depicted in FIG. 4, and elements that are the same or similar to those in FIG. 4 are referred to with the same reference numerals. For example, as shown in FIG. 5, an inner converter command 402 can be an on command during periods of time in which an outer converter duty cycle command 404 is non-zero. During periods of time when the outer converter duty cycle command 404 is zero, the inner converter command 402 can be an off command.

Figure 6:
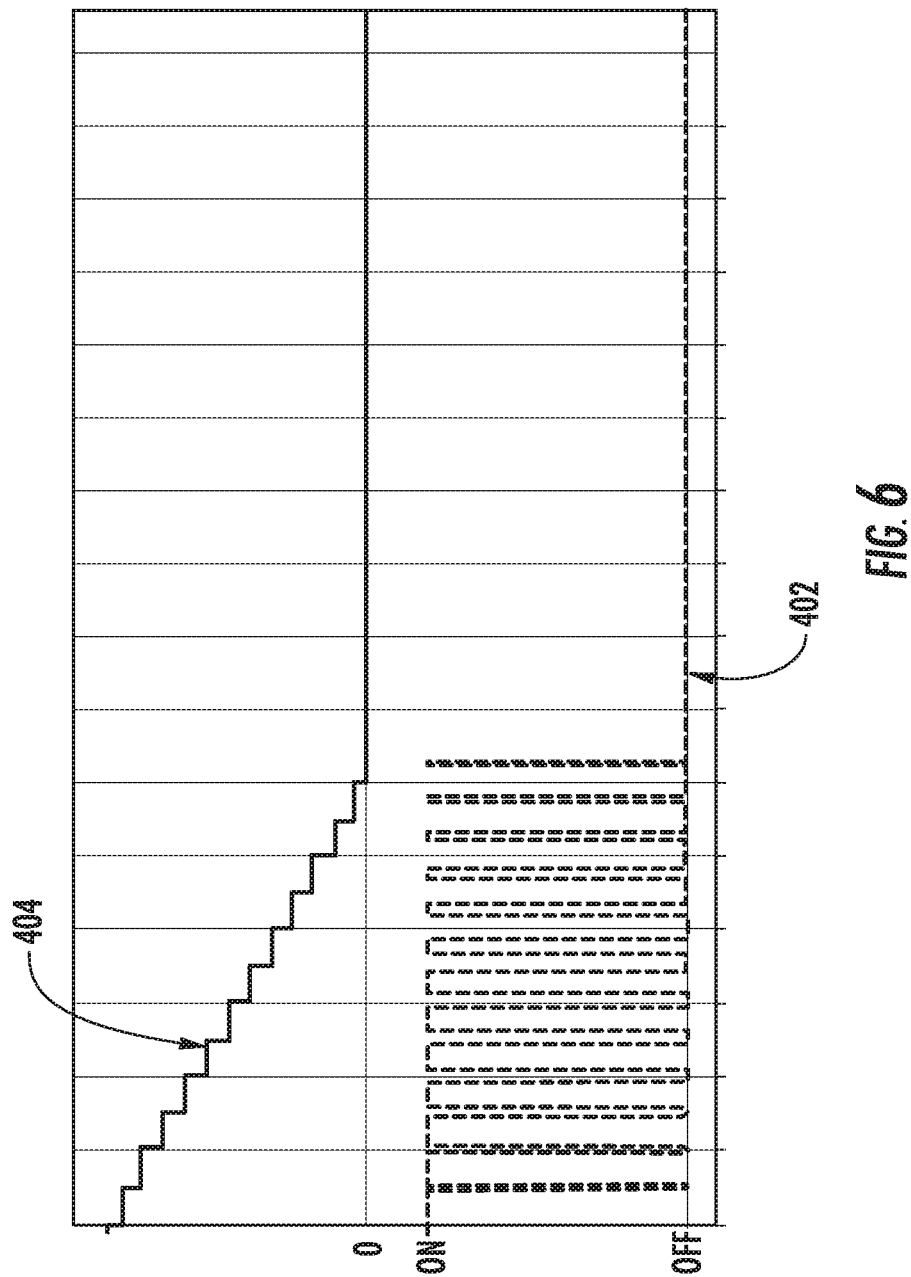
FIG. 6 depicts an example switching strategy according to example aspects of the present disclosure.

Referring now to FIG. 6, an example switching strategy according to example aspects of the present disclosure is depicted. FIG. 6 depicts an additional switching strategy, and elements that are the same or similar to those in FIGS. 4 and 5 are referred to with the same reference numerals. An outer converter duty cycle command 404 can be used to provide one or more gate commands to the outer converter 216. As shown, an outer converter duty cycle command 404 can be non-zero during operation of the outer converter 216. For example, an outer converter 216 may be operated in a PWM mode, such as to regulate a line current of a line side converter 168. While operating in PWM mode, the outer converter 216 can provide a series of pulses wherein the pulses comprise a non-zero voltage (i.e., an "on period") and a zero voltage (i.e., an "off period"). The inner converter command 402 can be an on command during the periods of time that the outer converter duty cycle command 404 is a command to provide an on period of a pulse. For example, an inner converter 240 can be turned on during the periods of time in which an outer converter 216 is in PWM mode and providing a non-zero voltage pulse (i.e., an on period). When the outer converter 216 is in PWM mode and providing a zero voltage pulse (i.e., an off period), an inner converter 240 can be turned off.

Referring now to FIGS. 4-6 generally, the switching strategy is depicted to allow for an output voltage of an outer converter 216 to be determined and further for operation of an inner converter 240 to be controlled based at least in part on the output voltage of the outer converter 216. For example, when the output voltage of the outer converter is zero volts, the inner converter 240 can be controlled to an off state. When the output voltage of the outer converter 216 is non-zero, an inner converter 240 can be controlled to an on state. For example, a control device and/or control system can determine an output voltage of the outer converter 216 by identifying one or more gate commands to the outer converter. Further, the inner converter 240 can be controlled based at least in part on the one or more gate commands to the outer converter 216. For example, when the one or more gate commands to the outer converter comprise a non-zero duty cycle, the inner converter 240 can be controlled to an on state. Moreover an inner converter 240 can be controlled based at least in part on the one or more gate commands to the outer converter 216 by controlling a duty cycle of gate commands to the inner converter 240 based at least in part on the duty cycle of day commands to the outer converter 216. For example, the duty cycle of gate commands to the inner converter 240 can be the same as the duty cycle of gate commands to the outer converter 216, such as, for example, by turning the inner converter 240 to an on state in a PWM mode that corresponds to the PWM mode of the outer converter 216. In this way, the duty cycle of gate commands to the inner converter 240 can be controlled to match the duty cycle of gate commands to the outer converter 216.

Moreover, the systems and methods according to example aspects of the present disclosure can be implemented in DC to AC converters, such as DC to DC to AC converters which comprise one or more silicon carbide MOSFETs and an isolation transformer. Further, the systems and methods according to example aspects of the present disclosure can be used in DC to AC converters which comprise a plurality of inverter blocks, such as inverter blocks 206-210 depicted in FIGS. 2 and 3. Moreover, the systems and methods according to example aspects of the present disclosure can be used in multi-phase (e.g., three phase) power converters, wherein the systems and methods are applied to each phase of power converted by a power converter.

Figure 7:
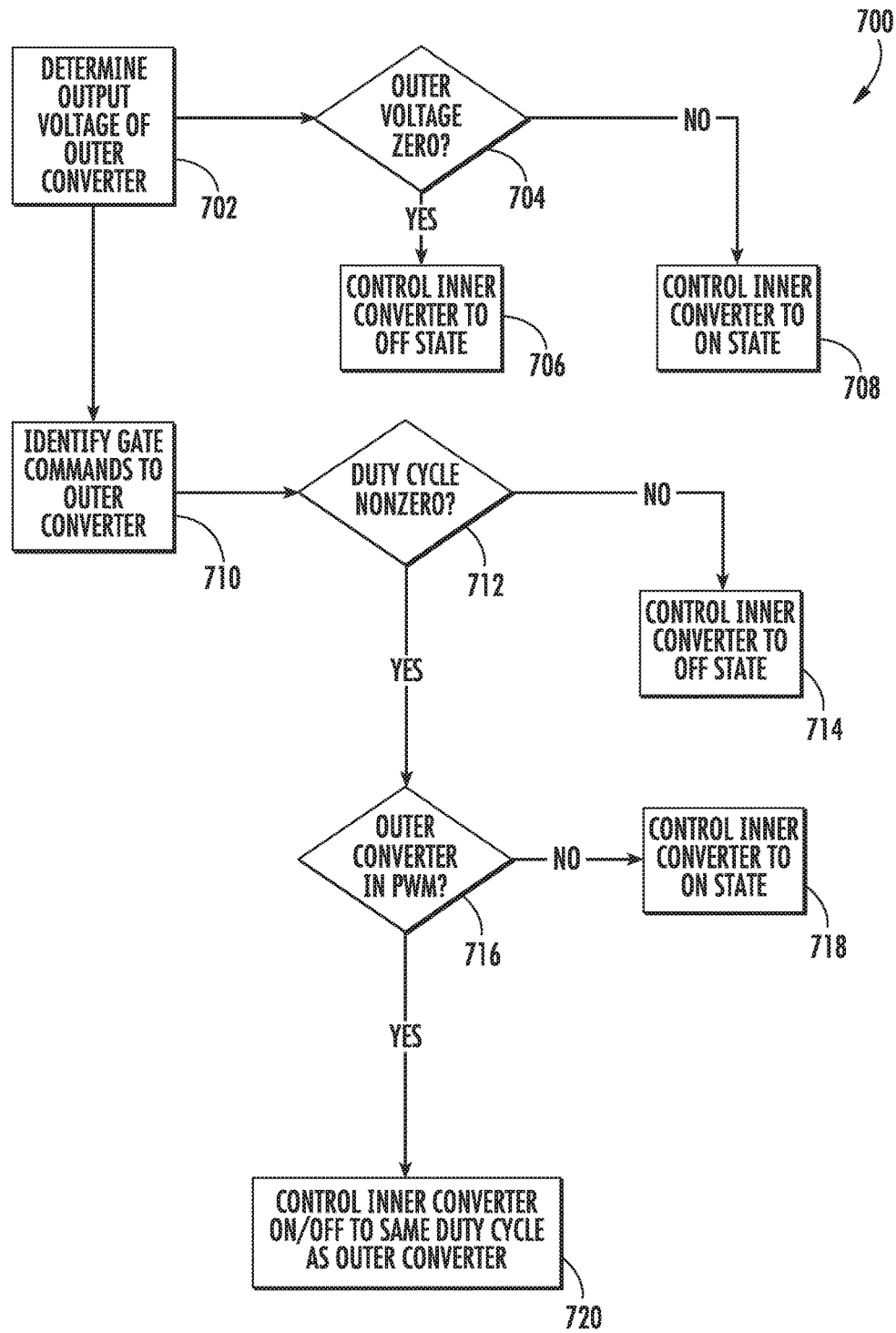
FIG. 7 depicts an example method according to example aspects of the present disclosure.

Referring now to FIG. 7, an example control method (700) for operating a DC to AC converter according to example aspects of the present disclosure is depicted. The DC to AC converter can include an inner converter and an outer converter. For example, an inner converter can be an inner converter 240, and can include an isolation transformer, such as an isolation transformer 226, and one or more silicon carbide MOSFETs. Similarly, the outer converter, such as an outer converter 216, can include one or more silicon carbide MOSFETs. For example, the inner converter 240 and the outer converter 216 can include a plurality of bridge circuits, which can include a plurality of silicon carbide MOSFETs. The DC to AC converter can be, for example, a DC to DC to AC converter, which can include a plurality of inverter blocks, such as inverter blocks 206-210. The DC to AC converter can be, for example, a line side converter 168 in a wind power generation system 100.

At (702), the method (700) can include determining an output voltage of the outer converter. For example, an output voltage can be determined by one or more measured parameters, such as from one or more sensors configured to measure an output voltage of an outer converter 216. Additionally, an output voltage can be determined based at least in part on one or more gate commands to an outer converter. In an embodiment, the output voltage can be determined by a control system, which can include one or more control devices.

At (704), the method (700) can include determining whether the output voltage is zero. If the output voltage of the outer converter 216 is zero, at (706) the method (700) can include controlling the inner converter to an off state. For example, an inner converter 240 can be controlled such that power flow through the inner converter 240 is essentially zero. If the output voltage of the outer converter 216 is non-zero, at (708), the method (700) can include controlling the inner converter to an on state. For example, an inner converter 240 can be controlled to an on state such that power flows through the inner converter 240, including through an isolation transformer 226 of the inner converter 240.

At (710), the method (700) can include identifying one or more gate commands to the outer converter. For example, an output voltage of the outer converter can be determined by identifying one or more gate commands to the outer converter. Further, the operation of the inner converter, such as an inner converter 240, can be controlled based at least in part on the one or more gate commands to the outer converter.

For example, at (712), the method (700) can include determining whether the duty cycle of the outer converter is non-zero. If the duty cycle is zero, at (714) the inner converter 240 can be controlled to an off state. If the duty cycle is non-zero, at (716), the method can include determining whether the outer converter 216 is in PWM mode. For example, if the outer converter is not in a PWM mode, the inner converter can be controlled to an on state. For example, if an outer converter duty cycle command 404 is non-zero and the outer converter 216 is not in a PWM mode, the inner converter 240 can be controlled to an on state such the power flows through the inner converter 240. If, however, the outer converter 240 is in a PWM mode, then at (720) the inner converter 240 can be controlled to the same duty cycle as the outer converter 216. For example, the duty cycle of gate commands to the inner converter 240 can be the same as the duty cycle of gate commands to the outer converter 216. In this way, the inner converter 240 can be turned on during periods of an on pulse from an outer converter 216, and the inner converter 240 can be turned off during periods of an off pulse from an outer converter 216.

In this way, controlling an inner converter 240 can be based at least in part on the one or more gate commands to the outer converter 216. Further, the duty cycle of gate commands to inner converter 240 can be controlled based at least in part on the duty cycle of gate commands to the outer converter 216. For example, the duty cycle of gate commands to the inner converter 240 can be the same as the duty cycle of gate commands to the outer converter 216.

Figure 8:
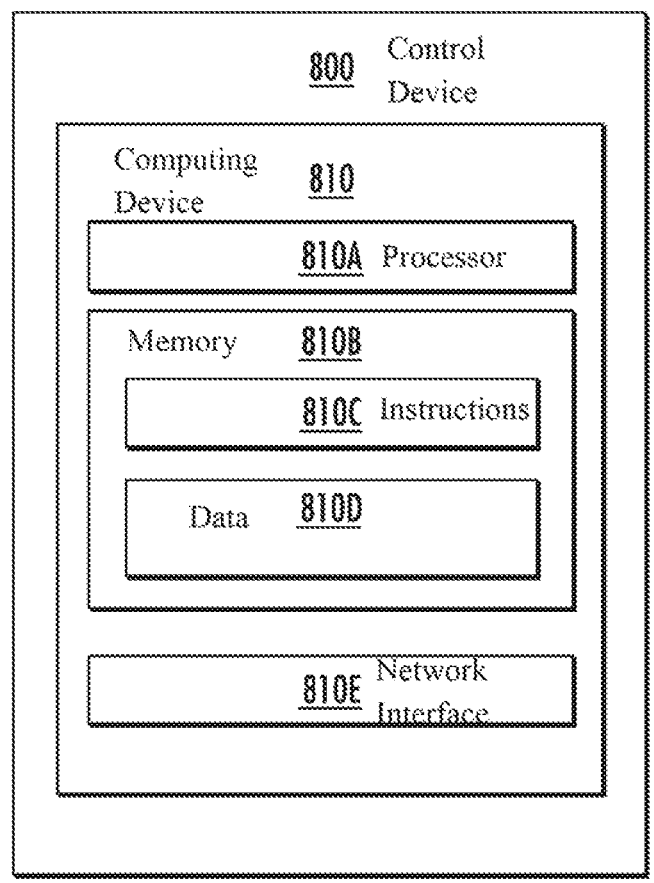
FIG. 8 depicts elements suitable for use in a control device according to example aspects of the present disclosure.

FIG. 8 depicts an example control device 800 according to example embodiments of the present disclosure. The control device 800 can be used, for example, as a control device 174 or a control system 176 in a wind power generation system 100. The control device 800 can include one or more computing device(s) 810. The computing device(s) 810 can include one or more processor(s) 810A and one or more memory device(s) 810B. The one or more processor(s) 810A can include any suitable processing device, such as a microprocessor, microcontrol device, integrated circuit, logic device, and/or other suitable processing device. The one or more memory device(s) 810B can include one or more computer-readable media, including, but not limited to, non-transitory computer-readable media, RAM, ROM, hard drives, flash drives, and/or other memory devices.

The one or more memory device(s) 810B can store information accessible by the one or more processor(s) 810A, including computer-readable instructions 810C that can be executed by the one or more processor(s) 810A. The instructions 810C can be any set of instructions that when executed by the one or more processor(s) 810A, cause the one or more processor(s) 810A to perform operations. In some embodiments, the instructions 810C can be executed by the one or more processor(s) 810A to cause the one or more processor(s) 810A to perform operations, such as any of the operations and functions for which the computing system 800 and/or the computing device(s) 810 are configured, the operations for controlling a DC to AC converter (e.g., method 700), as described herein, and/or any other operations or functions of the one or more computing device(s) 810. The instructions 810C can be software written in any suitable programming language or can be implemented in hardware. Additionally, and/or alternatively, the instructions 810C can be executed in logically and/or virtually separate threads on processor(s) 810A. The memory device(s) 810B can further store data 810D that can be accessed by the processor(s) 810A. For example, the data 810D can include data indicative of power flows, current flows, actual voltages, nominal voltages, and/or any other data and/or information described herein.

The computing device(s) 810 can also include a network interface 810E used to communicate, for example, with the other components of system 800 (e.g., via a network). The network interface 810E can include any suitable components for interfacing with one or more network(s), including for example, transmitters, receivers, ports, control devices, antennas, and/or other suitable components. For example, the network interface 810E can be configured to communicate with one or more sensors in a wind power generation system 100, such as one or more voltage sensors. Further, the network interface 810 can be configured to communicate with a control system, such as a control system 176, or control device, such as a control device 174.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The present disclosure is discussed with reference to DFIG power generation systems including a power converter utilizing silicon carbide MOSFETs for purposes of illustration and discussion. Those of ordinary skill in the art, using the disclosures provided herein, will understand that other power generation systems and/or topologies can benefit from example aspects of the present disclosure. For instance, the grounding and protection schemes disclosed herein can be used in a wind, solar, gas turbine, or other suitable power generation system. Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for operating a DC to AC converter, the DC to AC converter comprising an inner converter and an outer converter, the inner converter comprising an isolation transformer and a first plurality of switching devices, the outer converter comprising a second plurality of switching devices, the method comprising:
   determining an output voltage of the outer converter;
   controlling the inner converter to be in an on state or an off state based at least n part on the output voltage of the outer converter;
   wherein the inner converter is turned on during periods of time where the outer converter is in pulse width modulation (PWM) mode and operating in an on period of a pulse; and
   wherein the inner converter is turned off during periods of time when the outer converter is in PWM mode and operating in an off period of a pulse.

2. The control method of claim 1, wherein at least one switching device in the first plurality or second plurality of switching devices comprises a silicon carbide MOSFET.

3. The control method of claim 1, wherein when the output voltage of the outer converter is zero volts, controlling operation of the inner converter based at least in part on the output voltage of the outer converter comprises controlling the inner converter to be in an off state.

4. The control method of claim 1, wherein when the output voltage of the outer converter is non-zero, controlling operation of the inner converter based at least in part on the output voltage of the outer converter comprises controlling the inner converter to be in an on state.

5. The control method of claim 1, wherein determining an output voltage of the outer converter comprises identifying one or more gate commands to the outer converter; and
   wherein controlling operation of the inner converter based at least in part on the output voltage of the outer converter comprises controlling the inner converter based at least in part on the one or more gate commands to the outer converter.

6. The control method of claim 5, wherein when the one or more gate commands to the outer converter comprise a non-zero duty cycle, controlling the inner converter based at least in part on the one or more gate commands to the outer converter comprises controlling the inner converter to an on state when the outer converter is not in PWM mode.

7. The control method of claim 1, wherein the inner converter further comprises a first conversion entity and a second conversion entity;
   wherein the first conversion entity is a DC to AC conversion entity;
   wherein the second conversion entity is an AC to DC conversion entity; and
   wherein the isolation transformer is coupled between the first conversion entity and the second conversion entity.

8. The control method of claim 7, wherein the outer converter comprises a third conversion entity; and
   wherein the third conversion entity is a DC to AC conversion entity.

9. The control method of claim 1, wherein the DC to AC converter comprises a plurality of DC to DC to AC inverter blocks.

10. The control method of claim 1, wherein the DC to AC converter comprises a multiphase DC to AC converter; and
    wherein the control method is performed for each phase of multiphase power converted by the multiphase DC to AC converter.

11. A power conversion system, comprising:
    a DC to AC converter comprising an inner converter and an outer converter, the inner converter comprising an isolation transformer and a first plurality of switching devices, the outer converter comprising a second plurality of switching devices; and
    a control system configured to control operation of the DC to AC converter;
    wherein the control system is configured to:
       determine an output voltage of the outer converter; and
       control the inner converter to be in an on state or an off state based at least in part on the output voltage of the outer converter;
    wherein the inner converter is turned on during periods of time where the outer converter is in pulse width modulation (PWM) mode and operating in an on period of a pulse; and wherein the inner converter is turned off during periods of time when the outer converter is in PWM mode and operating in an off period of a pulse.

12. The power conversion system of claim 11, wherein when the output voltage of the outer converter is zero volts, the control system is configured to control the inner converter to an off state.

13. The power conversion system of claim 11, wherein when the output voltage of the outer converter is non-zero, the control system is configured to control the inner converter to an on state.

14. The power conversion system of claim 11, wherein the control system is configured to determine an output voltage of the outer converter by identifying one or more gate commands to the outer converter; and
wherein the control system is configured to control the inner converter based at least in part on the one or more gate commands to the outer converter.

15. The power conversion system of claim 14, wherein when the one or more gate commands to the outer converter comprise a non-zero duty cycle, the control system is configured to control the inner converter to an on state when the outer converter is not in PWM mode.

16. The power conversion system of claim 14, wherein the control system is configured to control the inner converter based at least in part on the duty cycle of gate commands to the outer converter.

17. The power conversion system of claim 16, wherein the control system is configured to control the duty cycle of gate commands to the inner converter to match the duty cycle of gate commands to the outer converter.

18. A wind power generation system, comprising:
a doubly fed induction generator configured to generate AC power;
an AC to DC converter coupled to a rotor of the doubly fed induction generator via a rotor bus, the AC to DC converter configured to convert the AC power from the doubly fed induction generator to a DC power;
a DC link coupled to the AC to DC converter, the DC link configured to receive DC power from the AC to DC converter;
a DC to AC converter coupled to the DC link, the DC to AC converter configured to receive DC power from the DC link; the DC to AC converter comprising an inner converter and an outer converter, the inner converter comprising an isolation transformer and a first plurality of switching devices, the outer converter comprising a second plurality of switching devices, at least one switching device in the first plurality or second plurality of switching devices comprising a silicon carbide MOSFET; and
a control system configured to control operation of the DC to AC converter;
wherein the control system is configured to:
determine an output voltage of the outer converter;
control the inner converter to be in an on state or an off state based at least in part on the output voltage of the outer converter;
wherein the inner converter is turned on during periods of time where the outer converter is in pulse width modulation (PWM) mode and operating in an on period of a pulse; and
wherein the inner converter is turned off during periods of time when the outer converter is in PWM mode and operating in an off period of a pulse.

* * * * *